United States Patent [19]
Ehret et al.

[11] 3,955,659
[45] May 11, 1976

[54] CLAMPING ROLLER FREE-WHEELING DEVICE ESPECIALLY FOR THE GUIDE WHEELS OF HYDRODYNAMIC TORQUE CONVERTERS

[75] Inventors: Fritz Ehret, Fellbach; Otto Wörner, Reutlingen; Ulrich Juskowiak, Stuttgart, all of Germany

[73] Assignee: Daimler-Benz Aktiengesellschaft, Germany

[22] Filed: Aug. 26, 1974

[21] Appl. No.: 500,711

[30] Foreign Application Priority Data
Aug. 28, 1973 Germany............................ 2343289

[52] U.S. Cl. ................................................ 192/45
[51] Int. Cl.² ............................................. F16D 41/06
[58] Field of Search .............. 192/44, 45; 188/82.84

[56] References Cited
UNITED STATES PATENTS

| | | | |
|---|---|---|---|
| 549,377 | 11/1895 | Ljungstrom........................... | 192/45 |
| 1,708,215 | 4/1929 | Chryst................................... | 192/45 |
| 2,890,602 | 6/1959 | Smirl et al. ......................... | 74/677 X |
| 3,691,854 | 9/1972 | Barthruff........................... | 192/45 X |

FOREIGN PATENTS OR APPLICATIONS

| | | | |
|---|---|---|---|
| 1,026,948 | 4/1966 | United Kingdom................... | 192/45 |

*Primary Examiner*—Allan D. Herrmann
*Attorney, Agent, or Firm*—Craig & Antonelli

[57] ABSTRACT

A gripping roller free-wheeling device, with a springy support of the gripping rollers on cross tongues of a cage which is formed by two or more annular members disposed adjacent the gripping rollers; the tongues are stamped out of the sheet metal annular members and are bent off approximately at right angle to the plane of the annular members whereby the form and position of the stamping edge is such that the stamped-out openings which remain in one annular member approximately within the area of half the pitch of the cross tongues, permit the passage therethrough of the bent-off cross tongues of the other annular member.

16 Claims, 5 Drawing Figures

CLAMPING ROLLER FREE-WHEELING DEVICE ESPECIALLY FOR THE GUIDE WHEELS OF HYDRODYNAMIC TORQUE CONVERTERS

The present invention relates to a gripping roller free-wheeling device, especially for guide wheels of hydrodynamic torque converters or for parts of a planetary gear change-speed transmission, with an elastic support of the clamping or gripping rollers on the cross tongues of a cage which is formed by a sheet metal ring disposed adjacent the gripping rollers, out of which the tongues are punched out and are bent off approximately at right angle to the plane of the sheet metal ring.

With known free-wheeling devices of the aforementioned type (German Auslegescrift No. 1,254,916), the subdivision of the cage is dependent in principle on the width of the gripping rollers, i.e., the pitch of the cross tongues is dependent on the required width thereof which, in turn, depends on the width of the gripping rollers. This is so as the cross tongues have to extend in practice over the entire width of the clamping or gripping rollers, as otherwise a unilateral load would result which might lead to an inclined positioning of the gripping rollers. This leads to the fact that with very wide gripping rollers, one is able to accommodate only a limited number thereof so that the free-wheeling device—as viewed from an overall point of vent—can be loaded only with small forces.

The present invention is concerned with the task to avoid the described disadvantages. Consequently, an arrangement is to be proposed in which it is possible to accommodate a larger number of gripping rollers. As solution to the underlying problems, the present invention offers the general concept to offset with respect to each other two cages which are identical as such, by half a pitch so that then compared to the construction with a single cage, twice the number of gripping rollers can therefore be accommodated. It is possible without any difficulty to make the cross tongues of a sufficient length in that case, notwithstanding double the number of gripping rollers with the same dimensions. It is therefore proposed by the present invention to impart to the stamping edge such a form and position that the stamped-out aperture permits within the area of half the pitch the passage therethrough of a respective bent-off cross tongue.

This configuration can also be expressed in other words. If the cross tongues are arranged within the inner area of the sheet metal ring, i.e., if therefore the stamping edge starts from the inner circumference of the sheet metal ring and if the bending edge extends radially, then the upper edge of the sheet metal tongue, that is, therefore the stamping edge provided therefor, is to be tangential or inclined so slightly that a larger radial distance prevails within the area of half the pitch than at the bending place. This refers naturally to the respective outer points at the stamping edge and at the bending place. Of course, this principle may be used analogously when the cross tongues are disposed within the outer area of the sheet metal ring and consequently the stamping edges start from the outer circumference of the sheet metal ring. Finally, the present invention is not limited in principle to the use of two cages but instead also three or even more cages may be used if the offset takes place respectively by the corresponding fraction of the pitch.

The mutual fixing of the two cages takes place appropriately in the outer race of the free-wheeling device, even though the arrangement of corresponding fixing means at the cages themselves is feasible in principle.

Accordingly, it is an object of the present invention to provide a gripping roller free-wheeling device of the type described above which avoids by simple means the shortcomings and drawbacks mentioned hereinabove.

Another object of the present invention resides in a gripping roller free-wheeling device in which the number of cross tongues that may be provided is not dependent on the structural width of the gripping rollers, yet the danger of causing an inclination of the gripping rollers is effectively avoided.

A further object of the present invention resides in a free-wheeling device which with substantially the same dimensions can be subjected to relatively larger forces.

Still another object of the present invention resides in a gripping roller free-wheeling device which enables the accommodation of a relatively larger number of gripping rollers without sacrificing the required length of the cross tongues used as supports.

These and further objects, features and advantages of the present invention will become more apparent from the following description when taken in connection with the accompanying drawing which shows, for purposes of illustration only, one embodiment in accordance with the present invention, and wherein.

Figure 1:
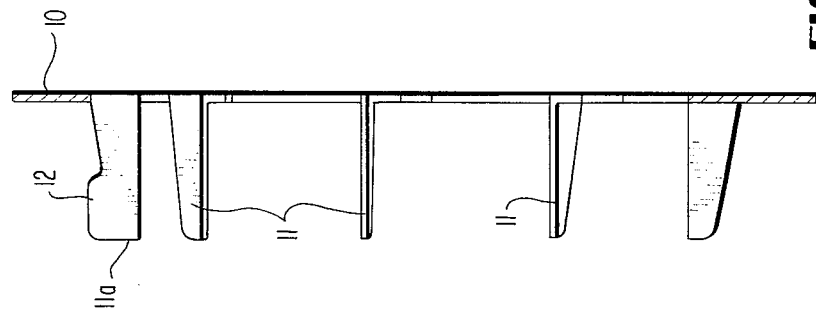
FIG. 1 is a cross-sectional view through a cage of a free-wheeling device in accordance with the present invention.
Figure 2:
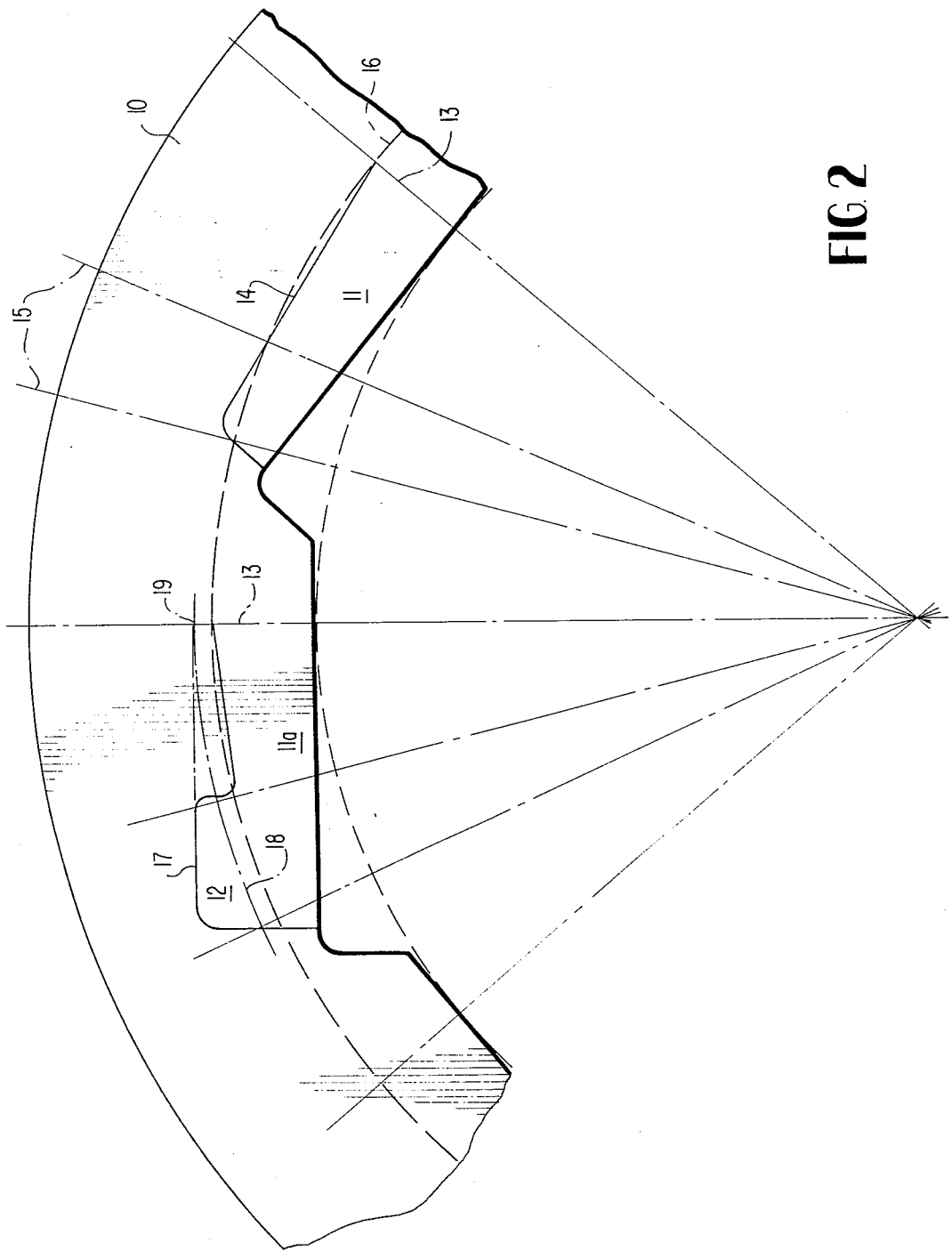
FIG. 2 is a partial side elevational view of the sheet metal ring prior to the stamping out and bending of the cross tongues.
Figure 5:
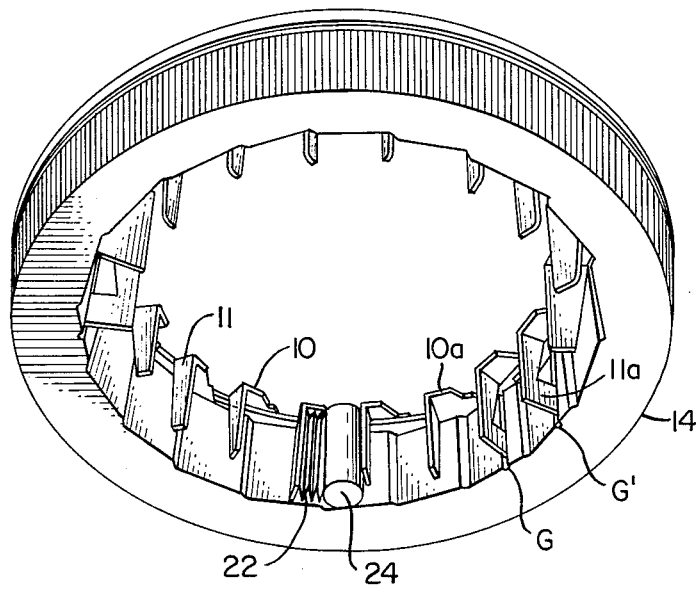
FIG. 5 is a perspective view of the assembled free-wheeling arrangement in accordance with the present invention.

Referring now to the drawing wherein like reference numerals are used throughout the various views to designate like parts, and more particularly to FIGS. 1 and 2, according to these figures, an annular member in the form of a sheet metal disk 10 arranged axially perpendicularly serves for the formation of a cage; several cross tongues 11 are laterally bent out of this sheet metal disk 10. Of these cross tongues, the cross tongue 11a is provided with an upwardly directed nose portion 12, i.e., directed radially outwardly, by means of which it engages into a fixing groove G or G' of the free-wheeling outer race 14 (FIG. 5). The cross tongues 11 and 11a are relatively wide so that only nine such tongues can be accommodated over the circumference of the sheet metal disk 10.

FIG. 2 illustrates these tongues prior to being stamped or punched out. One tongue 11 and one tongue 11a with the upwardly directed nose portion 12 are illustrated in this figure. All cross tongues are disposed within the inner area of the sheet metal ring 10, i.e., their inner edges form part of the inner edge of the disk 10 in the non-punched out condition. They are bent out at right angle to the plane of the sheet metal ring 10 about the radially extending bending edges 13.

With the cross tongue 11, the upper edge 14 of the stamping edge now extends slightly inclined to the tangent at the bending edge 13. This inclination is so selected that the upper edge 14 within the area 15 of one-half the pitch, lies radially outside of the circle 16 which represents the uppermost portion of the bending edge 13. This means therefore, within this area 15, the bent-out cross tongue 11 can extend through the opening which remains after the stamping-out operation. In other words, the cross tongues of one disk, which is offset to another disk by half a pitch, are able to extend through the openings in the other disk which remain within the area 15 of the other disk after completion of the punching out and bending operations.

With the cross tongue 11a having the nose portion 12, analogously the same configuration is used. In that case, the upper edge 17 of the nose portion 12 lies radially outside the circular arc 18 which extends through the point 19 that one obtains by the projection of the upper edge 17 on the bending edge 13. Also in this case an opening therefore results, through which the bent-out cross tongue 11a can pass.

Figure 3:
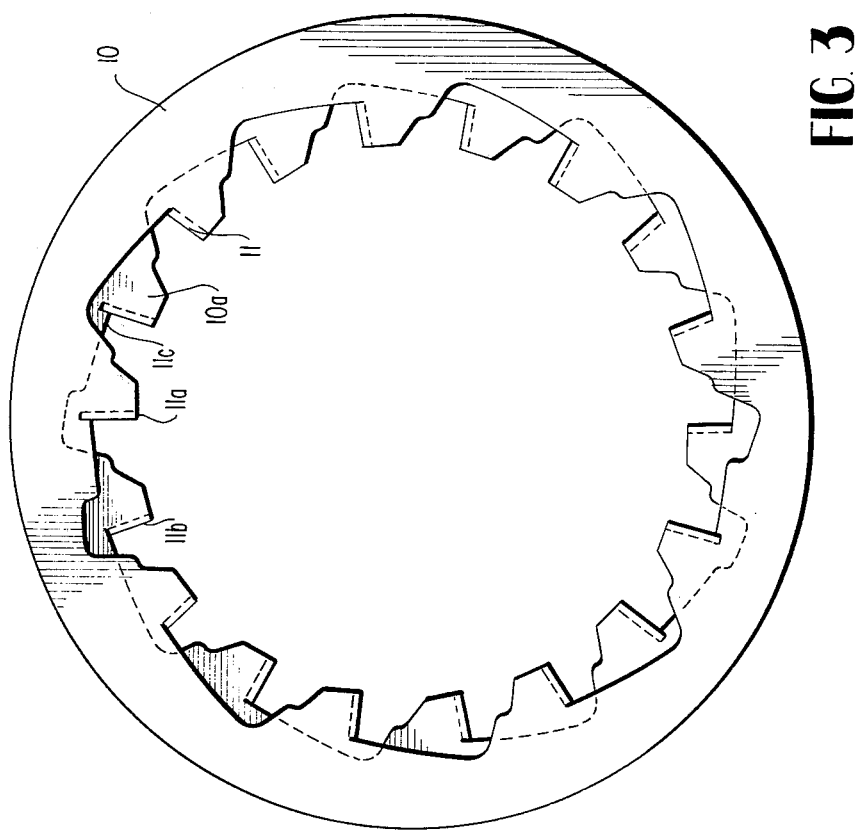
FIG. 3 is a side elevational view of a cage assembled of two sheet metal rings.

In FIG. 3, a cage is illustrated which is formed by two sheet metal rings 10 and 10a which are offset with respect to one another by one-half the spacing or half the pitch of the cross tongues. It can be readily recognized from this figure that the cross tongues 11 of the sheet metal ring 10 extend through the openings which are formed in the sheet metal ring 10a after the stamping out and bending off operations. The same is true analogously for the cross tongues 11a and 11c at the sheet metal rings 10 and 10a.

Figure 4:
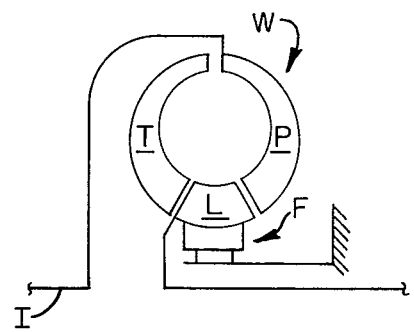
FIG. 4 is a schematic view of a hydrodynamic torque converter of a planetary change-speed transmission with the free-wheeling device in accordance with the present invention arranged thereat.

In FIG. 4, the free-wheeling device F is illustrated as being disposed at a guide wheel L of a hydrodynamic torque converter generally designated by the reference character W. As apparent the torque converter is provided in a change-speed transmission and includes a turbine wheel T and a pump P operatively connected to the transmission input shaft I.

As shown in FIG. 5, the cage formed by sheet metal rings 10, 10a are assembled in an outer race 14 with the nose portions of the respective cross tongues engaging fixing grooves G-G' and with the clamping or gripping rollers 24 being supported at the cross tongues by a spring 22.

The control may be so constructed that the cross tongues are bent out in the direction of the spring force or opposite thereto. In the former case, they are stressed in the bending direction by the spring force.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A gripping roller free-wheeling device comprising an elastic support of gripping rollers on cross tongues of a cage means, said cage means being formed by a ring means disposed adjacent the gripping rollers, the tongues being stamped out of the ring means and being bent along a bending edge approximately at right angle to the plane of the ring means, characterized in that at least two ring means are used which are offset to one another in such a manner that the tongues of one ring means are able to pass through the openings remaining in the other ring means after completion of the stamping and bending-out operations.

2. A gripping roller free-wheeling device according to claim 1, characterized by such a configuration and location of the stamping edges that the bent-off cross tongues of the one ring means are able to pass through the stamped-out openings of the other ring means approximately within the area of one half the pitch of the cross tongues thereof.

3. A gripping roller free-wheeling device according to claim 2, characterized in that the ring means forming the cage means are each constituted by a sheet metal ring.

4. A gripping roller free-wheeling device according to claim 2, characterized in that the free-wheeling device is for the guide wheel of a hydrodynamic torque converter.

5. A gripping roller free-wheeling device according to claim 2, characterized in that the free-wheeling device is for parts of a planetary gear change-speed transmission.

6. A gripping roller free-wheeling device according to claim 1, characterized in that each of the two ring means have stamped-out and bent-off cross tongues which are displaced with respect to one another by about half the pitch of the cross tongues in a respective ring means.

7. A gripping roller free-wheeling device with an outer race according to claim 6, characterized in that at least one of the cross tongues is provided with a radially outwardly directed nose portion for engagement in a corresponding groove provided in the outer race.

8. A gripping roller free-wheeling device according to claim 7, characterized in that the upper edge of the stamped-out edges of the cross tongues is slightly inclined with respect to a tangent at the bending edge which extends substantially in the radial direction of the ring means.

9. A gripping roller free-wheeling device according to claim 8, characterized in that the inclination of the upper edge is so selected that the upper edge within the area of about half the pitch, lies radially outwardly of the circle which passes through the uppermost portion of the bending edge of a respective tongue.

10. A gripping roller free-wheeling device according to claim 9, characterized in that in connection with the cross tongue having the nose portion, the upper edge of the nose portion is disposed radially outwardly of the circular arc which extends through the point obtained by the projection of the upper edge on the bending edge, with the bending edge extending substantially in the radial direction.

11. A gripping roller free-wheeling device according to claim 10, characterized in that the ring means forming the cage means are each constituted by a sheet metal ring.

12. A gripping roller free-wheeling device with an outer race according to claim 1, characterized in that at least one of the cross tongues is provided with a radially outwardly directed nose portion for engagement in a corresponding groove provided in the outer race.

13. A gripping roller free-wheeling device according to claim 1, characterized in that the upper edge of the stamped-out edges of the cross tongues is slightly inclined with respect to a tangent at the bending edge which extends substantially in the radial direction of the ring means.

14. A gripping roller free-wheeling device according to claim 13, characterized in that the inclination of the upper edge is so selected that the upper edge within the area of about half the pitch, lies radially outwardly of the circle which passes through the uppermost portion of the bending edge of a respective tongue.

15. A gripping roller free-wheeling device with an outer race according to claim 13, characterized in that at least one of the cross tongues is provided with a radially outwardly directed nose portion for engagement in a corresponding groove provided in the outer race.

16. A gripping roller free-wheeling device according to claim 15, characterized in that in connection with the cross tongue having the nose portion, the upper edge of the nose portion is disposed radially outwardly of the circular arc which extends through the point obtained by the projection of the upper edge on the bending edge, with the bending edge extending substantially in the radial direction.

* * * * *

UNITED STATES PATENT OFFICE
CERTIFICATE OF CORRECTION

Patent No. 3,955,659          Dated May 11, 1976

Inventor(s) Fritz EHRET et al

It is certified that error appears in the above-identified patent and that said Letters Patent are hereby corrected as shown below:

Title Page as it now reads:

"[30]  Foreign Application Priority Data
        Aug. 28, 1973 Germany..............2343289"

Title Page as it should read:

--[30]  Foreign Application Priority Data
        Aug. 28, 1973 Germany..............2343288--

Signed and Sealed this thirtieth Day of August 1977

[SEAL]

Attest:

RUTH C. MASON
Attesting Officer

C. MARSHALL DANN
Commissioner of Patents and Trademarks